Figure 1:
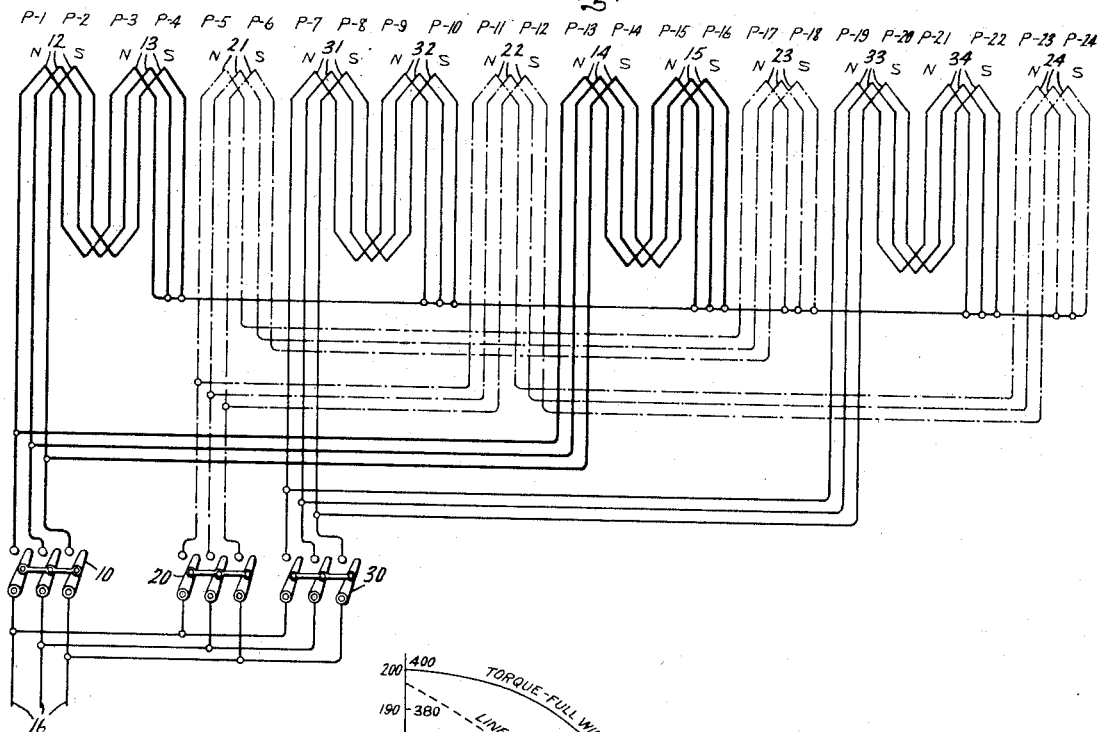

Aug. 21, 1934.  C. E. KILBOURNE  1,970,914

STARTING SYSTEM FOR ALTERNATING CURRENT MOTORS

Filed Nov. 18, 1933

Inventor:
Charles E. Kilbourne,
by Harry E. Dunham
His Attorney.

Patented Aug. 21, 1934

1,970,914

UNITED STATES PATENT OFFICE 1,970,914

STARTING SYSTEM FOR ALTERNATING CURRENT MOTORS

Charles E. Kilbourne, Schenectady, N. Y., assignor to General Electric Company, a corporation of New York Application November 18, 1933, Serial No. 698,627

7 Claims. (Cl. 172—274)

My invention relates to starting systems for alternating current motors and its object is to provide an improved arrangement and method for starting polyphase motors. While my invention is particularly applicable for starting synchronous motors, it may be used to start any other type of polyphase machine, such as a synchronous converter, an induction motor, etc.

One of the arrangements now in use for starting polyphase synchronous motors consists in first connecting a part of the armature winding directly to the supply circuit. After the motor has accelerated, the rest of the armature winding is connected to the supply circuit. Heretofore, there have been two general types of part windings which have been used for these starting purposes.

One of these general types consists in providing the motor armature with two or more polyphase circuits with corresponding coil sides of all of the circuits disposed in a predetermined manner under each pole of the machine. One such class of windings is known as an alternate slot arrangement in which the corresponding coil sides of the two circuits of a two-circuit winding, for example, are arranged in adjacent slots so that when only one circuit is energized there is an energized slot followed by an unenergized slot. Such a type of winding is disclosed in Chase Patent No. 1,815,832, granted July 21, 1931. Another such class of windings is known as an alternate phase belt arrangement in which in a two-circuit arrangement, for example, a plurality of coil sides of one circuit is arranged in a group of adjacent slots under each pole and a corresponding plurality of coil sides of another circuit are arranged in another group of slots under each pole so that when only one circuit is energized there is in each phase belt a group of energized slots followed by a group of unenergized slots. Such a type of winding is disclosed in the British Patent No. 366,184.

This general type of part winding affects the starting characteristics of the machine in somewhat the same manner that a reactor placed in the external line does. That is, it reduces both the starting current and the starting torque but unfortunately the current goes down directly with the reduction factor for the percentage of winding used whereas the torque goes down as the square of that factor. Therefore, this type of winding has the undesirable feature that the ratio between torque and current, that is, the torque efficiency, is materially less when only part of the winding is being used than when the whole winding is being used.

A second general type of part winding which has been used for motor starting consists in connecting half of the poles in one circuit and the other half of the poles in another circuit. In some cases alternate poles have been connected in one circuit and the remaining poles in the other and in other cases alternate pairs of poles or alternate groups of at least a pair of poles have been connected in one circuit and the remaining alternate pairs or groups of poles in the other circuit or circuits. This second general type of part winding has the undesirable feature that the torque curve when only one of the circuits is energized may have pronounced dips in it due to the presence of fields having other than the fundamental number of poles in the magnetic structure.

I have found that the undesirable features present in the latter of the two general types of part windings mentioned above can be eliminated by first energizing a large enough concentrated portion of the armature winding to eliminate or minimize these dips and then adding to this energized section additional adjacent sections of sufficient size and number to give the desired torque and current input characteristics. The important point is to increase the amount of the total armature circuit in use by increasing the size of the energized section rather than by adding another section which is not adjacent to another energized section.

I find that electrically the best results would be obtained by using the maximum concentration, that is with a two-circuit 32-pole machine, for example, one circuit would energize 16 adjacent poles and the other circuit would energize the other 16 poles. This arrangement, with only one circuit energized, would produce a torque curve having many small dips in it but no bad ones. However, this arrangement is mechanically very bad because it concentrates all the magnetic force in one direction and may pull the shaft out of center or do other undesirable things unless the mechanical parts are built large enough to stand the strain. Such a construction, however, results in an increase in the cost and weight of the machine. Therefore, to overcome this mechanical difficulty in cases where it is necessary to do so, I first energize diametrically opposite sections of the armature winding, each section being as large and as nearly equal to the other energized section as possible to give the desired starting torque and then I increase the sizes of these two sections to give the desired increases in torque necessary to accelerate the motor to synchronous speed. Preferably the increases are such that the two sections are maintained substantially equal in size at all times.

My invention will be better understood from the following description when taken in connection with the accompanying drawing and its scope will be pointed out in the appended claims.

Figure 2:
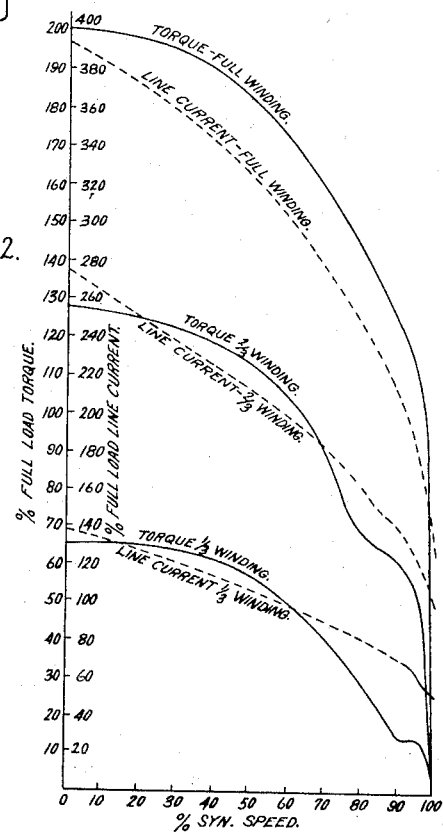

Fig. 1 illustrates diagrammatically a development on a plane surface of a part winding for a 24-pole polyphase machine and suitable switching means for starting such a motor in accordance with my invention and Fig. 2 illustrates the current input and torque characters of a 24-pole machine started in accordance with my invention.

Referring to Fig. 1, I have shown an arrangement embodying my invention for operating a 24-pole polyphase motor with one third of the motor armature winding energized, with two thirds of the motor armature winding energized and with all of the motor armature winding energized.

In order to simplify the disclosure, I have shown a single slot per pole per phase arrangement. Therefore, a 72-slot machine is shown. It will be understood, however, that my invention is not limited to any particular integral or fractional slot per pole per phase arrangement or to any particular coil pitch.

In the particular arrangement shown, I first energize one group of four adjacent poles and a diametrically opposite group of four adjacent poles so that eight poles or one third of the total number are simultaneously energized to start the motor. This result is obtained by closing switch 10 which connects the polyphase coil groupings 12, 13, 14 and 15 to the polyphase supply circuit 16. The coil groupings 12—15 inclusive are respectively disposed on the magnetic structure of the machine in any suitable manner well known in the art so as to produce the two adjacent poles P—1 and P—2, the poles P—3 and P—4 and the diametrically opposite poles P—13 and P—14 and poles P—15 and P—16.

In order to energize two thirds of the armature winding, I increase each energized section so that it includes eight poles. This may be done in a number of ways. For example, the adjacent group of poles P—5 to P—8 inclusive and the diametrically opposite group of poles P—17 to P—20 inclusive may be added respectively to group P—1 to P—4 inclusive and P—13 to P—16 inclusive or the adjacent group of poles P—21 to P—24 and the diametrically opposite group of poles P—9 to P—12 inclusive may be added respectively to the group of poles P—1 to P—4 inclusive and P—13 to P—16 inclusive. Such a grouping of poles, however, shifts the magnetic center of each energized group, which in some cases may be objectionable. Therefore, in order to avoid any such objection, I have shown an arrangement whereby the closing of a switch 20 connects to the supply circuit 16 the polyphase coil groupings 21, 22, 23 and 24 which are arranged on the magnetic structure of the motor in any suitable well-known manner so that they respectively form the poles P—5 and P—6, the poles P—11 and P—12, the poles P—17 and P—18 and the poles P—23 and P—24. Therefore, it will be seen that each energized section of four poles has been increased in size to an energized section of eight poles by energizing the adjacent pair of poles at each end thereof. In this manner the magnetic center line has not been shifted.

The remaining poles of the machine may be energized by closing a switch 30 which connects the remaining coil groupings 31, 32, 33 and 34 to the supply circuit 16. These coil groupings 31—34 inclusive may be arranged in any suitable manner so that when they are energized they form the poles P—7 to P—10 inclusive and the poles P—19 to P—22 inclusive.

While I have shown manually controlled switches 10, 20 and 30 for connecting the various polyphase coil groupings of the machine to the polyphase supply circuit 16, it will be evident to those skilled in the art that any suitable automatic means may be employed for effecting the operation of these switches in the proper sequence and at the proper time. For example, any suitable speed control or time control means, examples of which are well known in the art, may be employed for effecting the closing of the switches 20 and 30 in response to predetermined speeds of the machine or after a predetermined time lapse. Also it will be evident to those skilled in the art that if the machine being started is a synchronous motor, any suitable means may be provided for connecting the field winding thereof to a suitable source of direct current in order to pull the motor into synchronism at the proper time during the starting operation.

Fig. 2 shows the actual torque and line current characteristics of a 24-pole machine obtained by energizing the various poles thereof in the manner outlined above. It will be noted that the ratio of current to torque at any given speed is substantially the same in each case and that there are no bad dips in the torque curves when only part of the winding is being used. Therefore, there is no danger of the motor stalling during the starting operation.

My investigations show that the windings forming an energized section should at all times be concentrated as much as possible in order to eliminate the effect of harmonic fields on the torque curve and at the same time the energized windings should be so placed that the magnetic unbalance is as small as possible. Consequently, I find that the best practical arrangement is to start the machine by energizing two diametrically opposite substantially equal sections of the armature winding and then increasing the sizes of these two sections in a predetermined order in order to obtain the desired increases in torque as the motor accelerates. It will be observed, however, that in some cases it is impossible to have exactly the same number of poles in both of the energized sections. For example, in order to start a 34-pole machine with half of the winding energized, it is necessary to start with 17 poles energized. This may be done by energizing 8 poles in one of the two diametrically opposite sections and 9 poles in the other.

My investigations further show that when machines having 8 poles or less are started in accordance with my invention the two diametrically opposite groups of poles constitute so few poles that the harmonics in the magnetic field reach such a substantial size as to produce rather bad dips in the torque curve. Therefore, my invention is of particular utility in connection with machines having ten or more poles and is especially adapted for use in machines having a large number of poles, such as sixteen or more poles, as it provides an arrangement for increasing the two diametrically opposite groups in a large number of steps thus enabling a motor to be started with the current input maintained at all times during the starting operation within predetermined narrow limits. For example, a forty-eight pole machine may be started in six equal steps by first energizing two diametrically opposite groups of four adjacent poles, then successively increasing the number of poles in each group to eight, twelve, sixteen, twenty and twenty-four.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. The method of starting a polyphase motor comprising a plurality of polyphase primary coil groupings distributed on the magnetic structure of the motor so that each primary grouping forms at least one magnetic pole, which consists in energizing the groupings forming two diametrically opposite substantially equal groups of adjacent poles, the number of poles in each such group being less than half the total number of poles, and then increasing the sizes of said groups a plurality of times by energizing the remaining windings in a predetermined order.

2. The method of starting a polyphase motor having more than eight poles and comprising a plurality of polyphase primary coil groupings distributed on the magnetic structure of the motor so that each primary grouping forms at least one magnetic pole, which consists in energizing the groupings forming only two diametrically opposite substantially equal groups of adjacent poles, the number of poles in each such group being less than half the total number of poles, and then simultaneously increasing a plurality of times the number of poles in each group by energizing certain of the remaining groupings.

3. The method of starting a polyphase motor having more than eight poles and comprising a plurality of polyphase primary coil groupings distributed on the magnetic structure of the motor so that each primary grouping forms at least one magnetic pole, which consists in energizing the grouping forming only two diametrically opposite substantially equal groups of adjacent poles, the number of poles in each such group being less than half the total number of poles, and then simultaneously energizing a portion of the remaining groupings so as to form diametrically opposite groups of poles adjacent to each group of said first mentioned diametrically opposite groups so as to increase the sizes thereof in substantially equal amounts.

4. The method of starting a polyphase motor having more than eight poles and comprising a plurality of polyphase primary coil groupings distributed on the magnetic structure of the motor so that each primary grouping forms at least one magnetic pole, which consists in energizing the groupings forming only two diametrically opposite substantially equal groups of adjacent poles, the number of poles in each such group being less than half the total number of poles, and then increasing the number of poles in each group in a plurality of steps by energizing the groupings forming said additional poles in a predetermined order until each group comprises substantially half the total number of poles.

5. In combination, a polyphase motor of more than eight poles and comprising a plurality of polyphase coil groups distributed on its magnetic structure so that each grouping forms at least one magnetic pole, a polyphase supply circuit, and means for starting said motor including means for connecting only the groupings forming two diametrically opposite substantially equal groups of poles containing less than half the total number of poles to said supply circuit, and means for energizing in a plurality of steps the groupings forming the poles adjacent to each of said groups of poles in order to increase the number of poles therein in a predetermined order.

6. In combination, a polyphase motor of more than eight poles and comprising a plurality of polyphase coil groupings distributed on its magnetic structure so that each grouping forms at least one magnetic pole, a polyphase supply circuit, and means for starting said motor including means for connecting only the groupings forming two diametrically opposite substantially equal groups of poles containing less than half the total number of poles to said supply circuit, and means for simultaneously energizing the groupings forming a diametrically opposite group of poles adjacent to said first mentioned groups and containing less than the total number of remaining poles in order to increase the sizes of said first mentioned group in substantially equal amounts.

7. In combination, a polyphase motor of more than eight poles and comprising a plurality of polyphase coil groupings distributed on its magnetic structure so that each grouping forms a magnetic pole, a polyphase supply circuit, and means for starting said motor including means for connecting only the groupings forming two diametrically opposite substantially equal groups of poles containing less than half the total number of poles to said supply circuit, and means for successively energizing in a predetermined order the groupings forming poles adjacent to each of said first mentioned groups until each of said groups comprises substantially half the total number of poles.

CHARLES E. KILBOURNE.